(12) United States Patent
Mehta (10) Patent No.: US 12,277,868 B2
(45) Date of Patent: Apr. 15, 2025

(54) COLLABORATIVE CONTENT RANKING FOR SKILL DEVELOPMENT IN AN ONLINE EDUCATION PLATFORM

(71) Applicant: EdCast Inc., Mountain View, CA (US)

(72) Inventor: Karl Mehta, Fremont, CA (US)

(73) Assignee: EdCast Inc., Mountain View, CA (US)

( * ) Notice: Subject to any disclaimer, the term of this patent is extended or adjusted under 35 U.S.C. 154(b) by 354 days.

(21) Appl. No.: 15/365,924

(22) Filed: Nov. 30, 2016

(65) Prior Publication Data

US 2017/0236434 A1    Aug. 17, 2017

Related U.S. Application Data

(60) Provisional application No. 62/405,977, filed on Oct. 9, 2016, provisional application No. 62/260,631, filed on Nov. 30, 2015.

(51) Int. Cl.
    *G09B 5/08*      (2006.01)

(52) U.S. Cl.
    CPC ...................................... *G09B 5/08* (2013.01)

(58) Field of Classification Search
    CPC .............. G09B 5/08; G09B 7/02; G09B 7/00
    See application file for complete search history.

(56) References Cited

U.S. PATENT DOCUMENTS

| | | | |
|---|---|---|---|
| 6,633,742 B1* | 10/2003 | Turner | G09B 5/00 434/350 |
| 2007/0224586 A1* | 9/2007 | Massie | G09B 5/00 434/350 |
| 2010/0159438 A1* | 6/2010 | German | G06F 17/30525 434/433 |
| 2011/0189646 A1* | 8/2011 | Benninga | G09B 5/00 434/350 |
| 2011/0212430 A1* | 9/2011 | Smithmier | G09B 5/06 434/322 |
| 2013/0085955 A1* | 4/2013 | Dugas | G09B 5/00 705/326 |
| 2015/0317757 A1* | 11/2015 | Mihai | G06Q 50/20 705/326 |

* cited by examiner

*Primary Examiner* — Steve Rowland
(74) *Attorney, Agent, or Firm* — K&L GATES LLP (57) ABSTRACT

In one aspect, a computerized method for collaborative content scoring in an online educational platform includes the step of provide an educational content via the online educational platform. The method includes the step of determining a genre of the educational content. The method includes the step of setting a base score for the educational content. The method includes the step of receiving an explicit user feedback with respect to the educational content. The method includes the step of receiving an implicit user feedback with respect to the educational content. The method includes the step of adjusting the base score of the educational content to a score based on the explicit user feedback and the implicit user feedback.

4 Claims, 10 Drawing Sheets

COLLABORATIVE CONTENT RANKING FOR SKILL DEVELOPMENT IN AN ONLINE EDUCATION PLATFORM

CROSS-REFERENCE TO RELATED APPLICATIONS

This application is a claims priority from U.S. Provisional Patent Application No. 62/260,631, filed on 30 Nov. 2015. This application is a claims priority from U.S. Provisional Patent Application No. 62/405,977 filed on 9 Oct. 2016. These applications are hereby incorporated by reference in their entirety.

BACKGROUND

1. Field

This application relates generally to online education and more specifically to a method, system and article of manufacture of collaborative content ranking for skill development in online education platform.

2. Related Art

Traditional in-classroom education forces students to attend courses in a specific location at a specific time. All the students in the classroom receive the same instruction at the same pace. The Internet and the ubiquity of mobile devices enables online-educational platforms to be accessible to students at the students' individual convenience. Additionally, students can access the course anywhere there is Internet access. Online course can be paced to the student's schedule and learning style. Accordingly, methods and systems are needed to enable online educational platforms to provide a student educational content that is most appropriate to the student's current knowledge and/or learning style.

BRIEF SUMMARY OF THE INVENTION

In one aspect, a computerized method for collaborative content scoring in an online educational platform includes the step of provide an educational content via the online educational platform. The method includes the step of determining a genre of the educational content. The method includes the step of setting a base score for the educational content. The method includes the step of receiving an explicit user feedback with respect to the educational content. The method includes the step of receiving an implicit user feedback with respect to the educational content. The method includes the step of adjusting the base score of the educational content to a score based on the explicit user feedback and the implicit user feedback.

Optionally, the education content includes an online course content. The online course content includes an online lesson, a video lecture, an article, an interactive educational game or an audio lecture. The online course content is delivered via a video file, a text file or an audio file to a user's computing device. A genre of the education content includes an educational topic, a subject matter of the educational content, a pedagogical type or a targeted audience. The explicit-user feedback is weighted greater than the implicit-user feedback in adjusting the score of the educational content. The score is initially based on a current rating in a relevant genre of the user that posted the education content. The implicit user feedback is defined by a non-explicit interaction between a set of users and the educational content. The implicit feedback includes a length of times a video was watched, a number of questions asked in a forum, a number of times the educational content was shared by the user, a user's comment length, a user's comment content, a number of times the user reread the article and a number of citations by the user of the educational content in other content generated by the user. The user is ranked, and a ranking of the user is used such that a set of implicit actions of higher ranked users carries more weight in a calculation of the score of the education content based on implicit user actions. The online mobile platform is delivered through a mobile-device application.

The Figures described above are a representative set, and are not an exhaustive with respect to embodying the invention.

DESCRIPTION

Disclosed are a system, method, and article of manufacture for methods and systems of an online education platform. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Exemplary Computer Architecture and Systems

Figure 1:
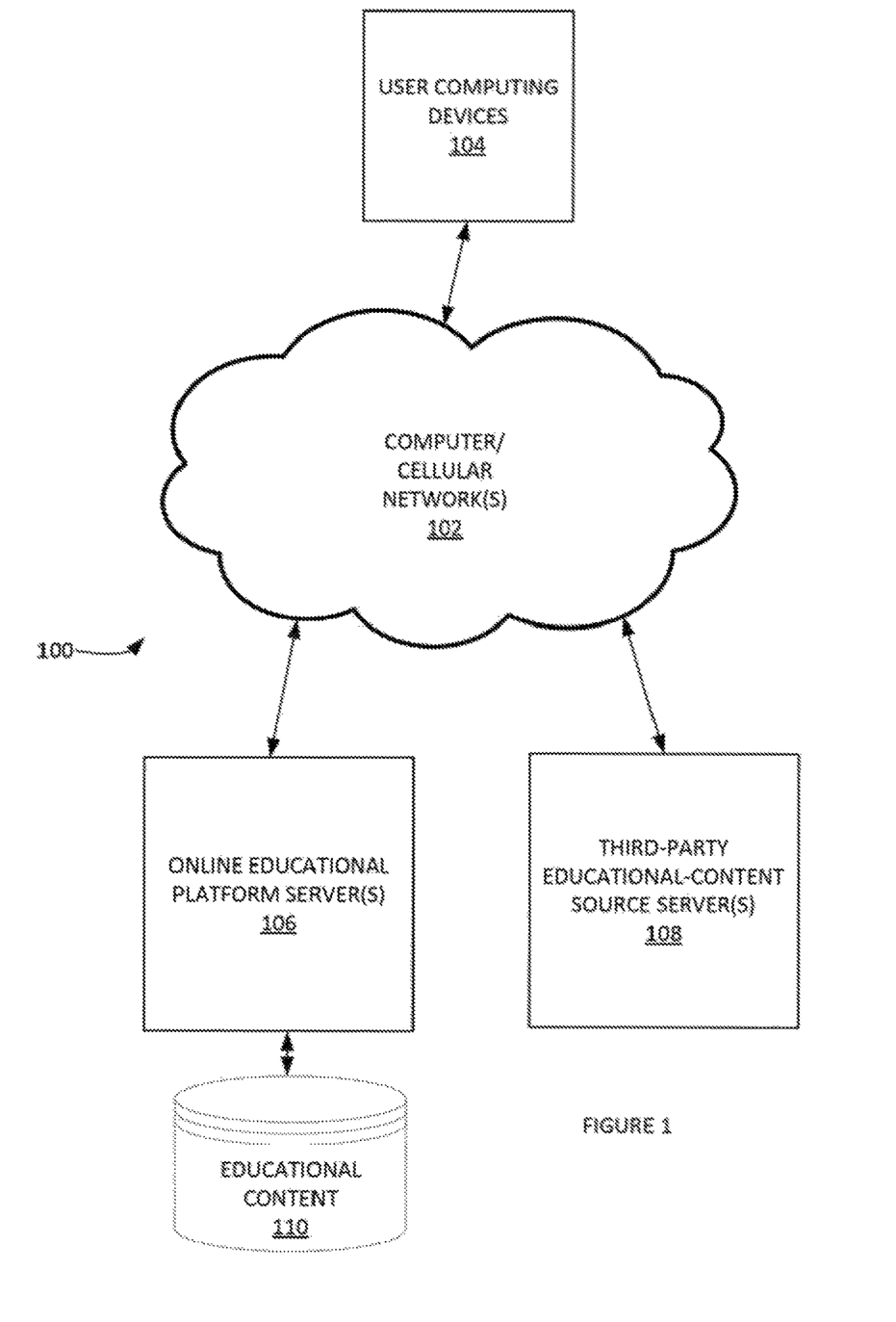
FIG. 1 illustrates an example system or managing an online educational platform, according to some embodiments.

FIG. 1 illustrates an example system 100 for managing an online educational platform, according to some embodiments. System 100 can be a social learning platform.

System 100 can include various computer and/or cellular data networks 100. Networks 102 can include the Internet, text messaging networks (e.g. short messaging service (SMS) networks, multimedia messaging service (MMS) networks, proprietary messaging networks, instant messaging service networks, email systems, etc. Networks 102 can be used to communicate messages and/or other information (e.g. videos, tests, articles, other educational materials, etc.) from the various entities of system 100.

User-computing devices 102 can be any computing device used by a user to access/consume educational content provided by system 100 (e.g. online education platform 106). Example user-computing devices can include, inter alia: personal computers, mobile devices, augmented reality devices, virtual reality devices, tablet computers, etc. User-computing devices 102 can access education content via a website, local application and the like. User-computing devices 102 can enable a user to upload educational content to online education platform 106. User-computing devices 102 can enable a user to upload test results to online education platform 106. User-computing devices 102 can enable a user to comment and/or otherwise interact with (e.g. 'like', share, recommend, etc.) the educational content provided by online education platform 106.

Online education platform 106 can manage and provide educational content to user-computing devices 102. For example, online education platform 106 can disseminate online courses, educational videos, educational articles, online exams, etc. Online education platform 106 can provide interfaces for obtaining user information. Online education platform 106 can include functionalities for implementing processes 400-1000 discussed infra. Educational content can be stored in a digital format in data store 110.

Online education platform 106 can include various other functionalities and systems, including, inter alia: email servers, text messaging servers, instant messaging servers, video-sharing servers, mapping and geolocation servers, network security services, language translation functionalities, database management systems, application programming interfaces, etc. Online education platform 106 can include various machine learning functionalities that can analyze user behavior, educational content, user profiles, etc. The analysis can be used to match users with educational content and/or otherwise optimize the user experience.

Figure 2:
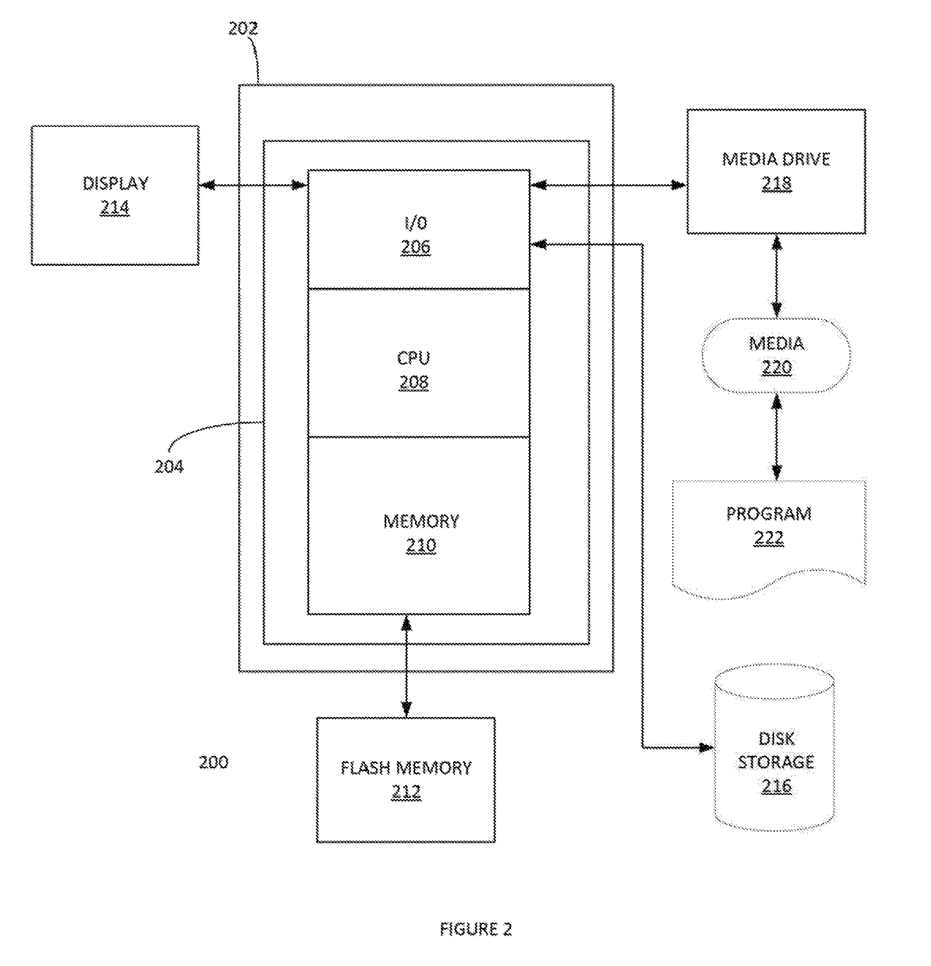
FIG. 2 depicts an exemplary computing system that can be configured to perform any one of the processes provided herein.

FIG. 2 depicts an exemplary computing system 200 that can be configured to perform any one of the processes provided herein. In this context, computing system 200 may include, for example, a processor, memory, storage, and I/O devices (e.g., monitor, keyboard, disk drive, Internet connection, etc.). However, computing system 200 may include circuitry or other specialized hardware for carrying out some or all aspects of the processes. In some operational settings, computing system 200 may be configured as a system that includes one or more units, each of which is configured to carry out some aspects of the processes either in software, hardware, or some combination thereof.

FIG. 2 depicts computing system 200 with a number of components that may be used to perform any of the processes described herein. The main system 202 includes a motherboard 204 having an I/O section 206, one or more central processing units (CPU) 208, and a memory section 210, which may have a flash memory card 212 related to it. The I/O section 206 can be connected to a display 214, a keyboard and/or other user input (not shown), a disk storage unit 216, and a media drive unit 218. The media drive unit 218 can read/write a computer-readable medium 220, which can contain programs 222 and/or data. Computing system 200 can include a web browser. Moreover, it is noted that computing system 200 can be configured to include additional systems in order to fulfill various functionalities. Computing system 200 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 3:
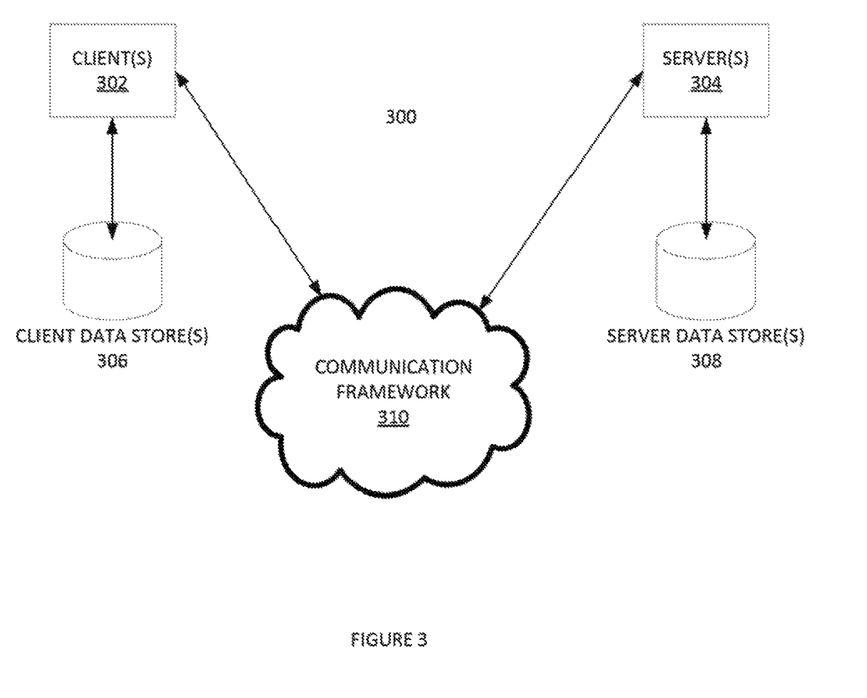
FIG. 3 is a block diagram of a sample computing environment that can be utilized to implement various embodiments.

FIG. 3 is a block diagram of a sample computing environment 300 that can be utilized to implement various embodiments. The system 300 further illustrates a system that includes one or more client(s) 302. The client(s) 302 can be hardware and/or software (e.g., threads, processes, computing devices). The system 300 also includes one or more server(s) 304. The server(s) 304 can also be hardware and/or software (e.g., threads, processes, computing devices). One possible communication between a client 302 and a server 304 may be in the form of a data packet adapted to be transmitted between two or more computer processes. The system 300 includes a communication framework 310 that can be employed to facilitate communications between the client(s) 302 and the server(s) 304. The client(s) 302 are connected to one or more client data store(s) 306 that can be employed to store information local to the client(s) 302. Similarly, the server(s) 304 are connected to one or more server data store(s) 308 that can be employed to store information local to the server(s) 304. In some embodiments, system 300 can instead be a collection of remote computing services constituting a cloud-computing platform.

EXEMPLARY METHODS

Various methods of an online education platform are provided herein.

Figure 4:
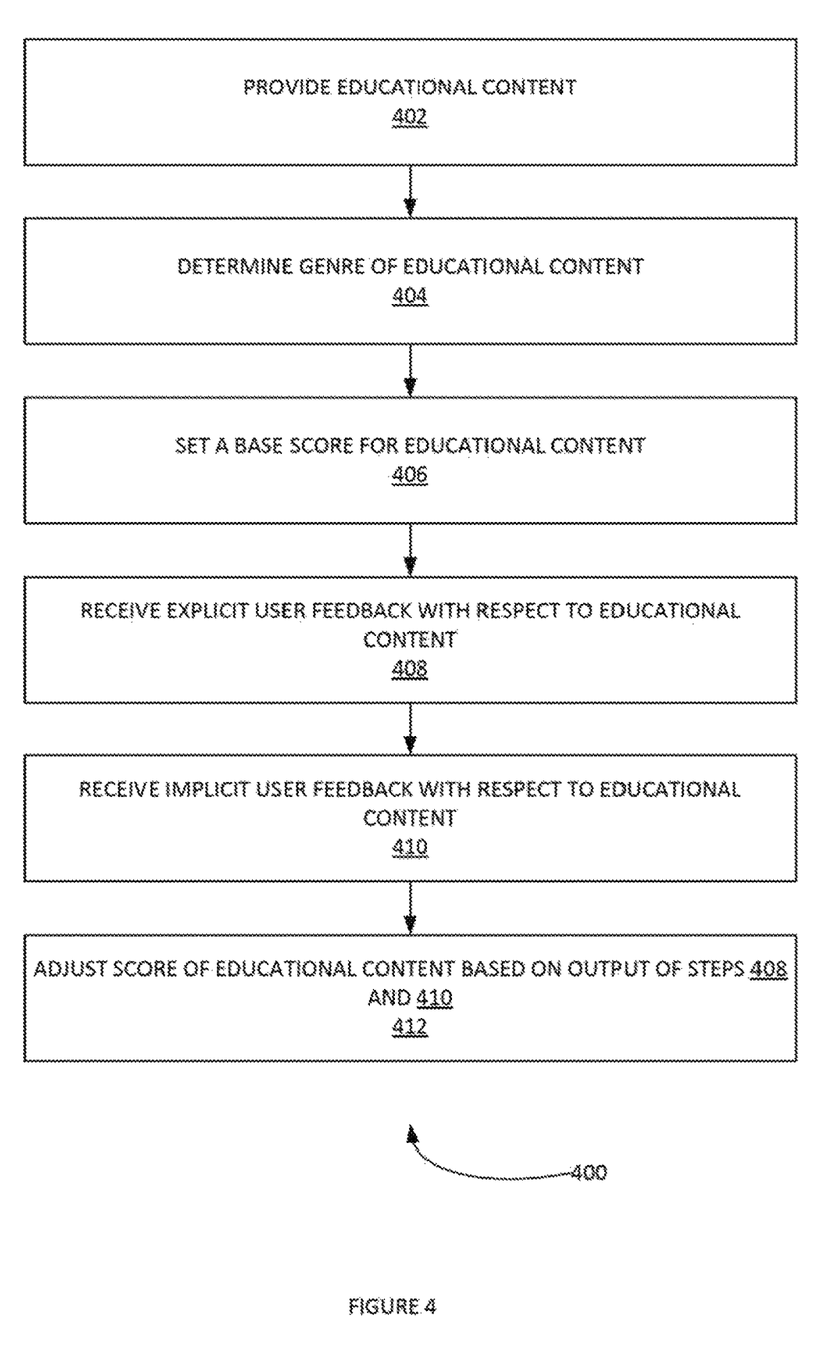
FIG. 4 illustrates an example process for collaborative content ranking for skill development, according to some embodiments.

Methods to Surface Content to Users Based On Competency Level for Skill Development FIG. 4 illustrates an example process 400 for collaborative content scoring, according to some embodiments. Process 400 can be utilized to rate content by quantitative methods of a user expressing reaction to content such, as, inter alia: social actions, likes, comments, interest sharing, etc. The user reaction can indicate that consumption of the educational content translated to improvement of a skill from the user's perspective. In one example, process 100 can rate educational-content difficulty on a discrete scale of levels one to ten (1-10) with ten (10) being the most difficult.

More specifically, in step 402, process 400 can provide an educational content. An educational content can be an online course content (e.g. an online lesson, a video lecture, an article, an interactive educational game, an audio lecture (e.g. a podcast and the like), etc.). Educational content can be delivered via video files, text files, audio files, etc. to a user's computing device (e.g. a mobile device, a personal computer, a laptop, an augmented-reality device, a virtual-reality device, etc.). Educational content can include course materials such as filmed lectures, readings, and problem sets. The educational content can be provided via an online educational platform (e.g. via a website, a mobile-device application, etc.).

In step 404, process 400 can determine a genre of the educational content. Example genres can include topics, subject matter(s), pedagogical types, targeted audience, etc. For example, a genre of a course can be determined to be university-level biological sciences. It is noted that genres can include enumerated sub-genres. For example, a genre can be computer programming. Sub-genres of this genre can be Python® programming, database programming, statistical programming, Ruby® programming, etc.

In step 406, process 400 can provide a base score for the educational content. Initially, the base score of an educational content can be based on the current rating in the relevant genre of the user that posted the education content. Users can be ranked (e.g. a competency score as provided in the discussion of process 500 infra). For example, a user with a ranking of 'Level 5' in statistical programming posts an article about statistical programming. This article can receive a base score of 'Level 5' or an equivalent. Other considerations can also be considered in determining a base score (e.g. word count, video length, explicit contributor assessment of difficulty of educational content, etc.). In one example, process 400 can calculate the base difficulty level of a piece of content based on the following factors, inter alia: estimated time commitment (e.g. number of word, length of videos, etc.); competency of the content creator; reputation of source of content (e.g. if user generated, competency level of the creator, if extracted from a website, how well reputed is the source, etc.).

In step 408, process 400 can received explicit user feedback with respect to the educational content. The explicit user feedback can be used to adjust the base score or current, score. The ranking of the user can also be taken into consideration. For example, if an 'expert' ranked user in business accounting 'likes' a video lecture on state taxation currently rated 'medium difficulty', then the rating of the video lecture can be increased. It is noted that the ratings or other explicit behaviors of higher ranked and/or more historical active users can be weighted higher than the ratings of lower ranked and/or less historical active users. For example, a 'Level 7' ranked user's 'like' can be weighted higher with respect to calculating a score than a 'Level 2' ranked user's 'like'. In one example, each user who consumes an educational content can be asked to rate the content on a difficulty level. This user-provided difficulty rating can be used as the output of step 408.

In step 410, process 400 can receive implicit user feedback with respect to the educational content. Implicit user feedback can be defined by defined by non-explicit interactions between users and the educational content. Example implicit feedback can include length of times a video was watched, number of questions asked in a forum, number of times educational content was shared by user, length/content of user's comments with respect to the educational content, number of times user reread an article, citations by the user of the educational content in other content generated by the user, etc. Again, the ranking of the user can also be taken into consideration such that the implicit actions of higher ranked users can carry more weight in the calculation of an education content's score based on implicit user actions.

In step 412, process 400 can adjust the score of the educational content based on the outputs of steps 408 and 410. It is noted that the outputs of either step can be weighted as well. For example, explicit-user feedback and be weighted greater than implicit user actions in adjusting the score of the educational content.

Figure 5:
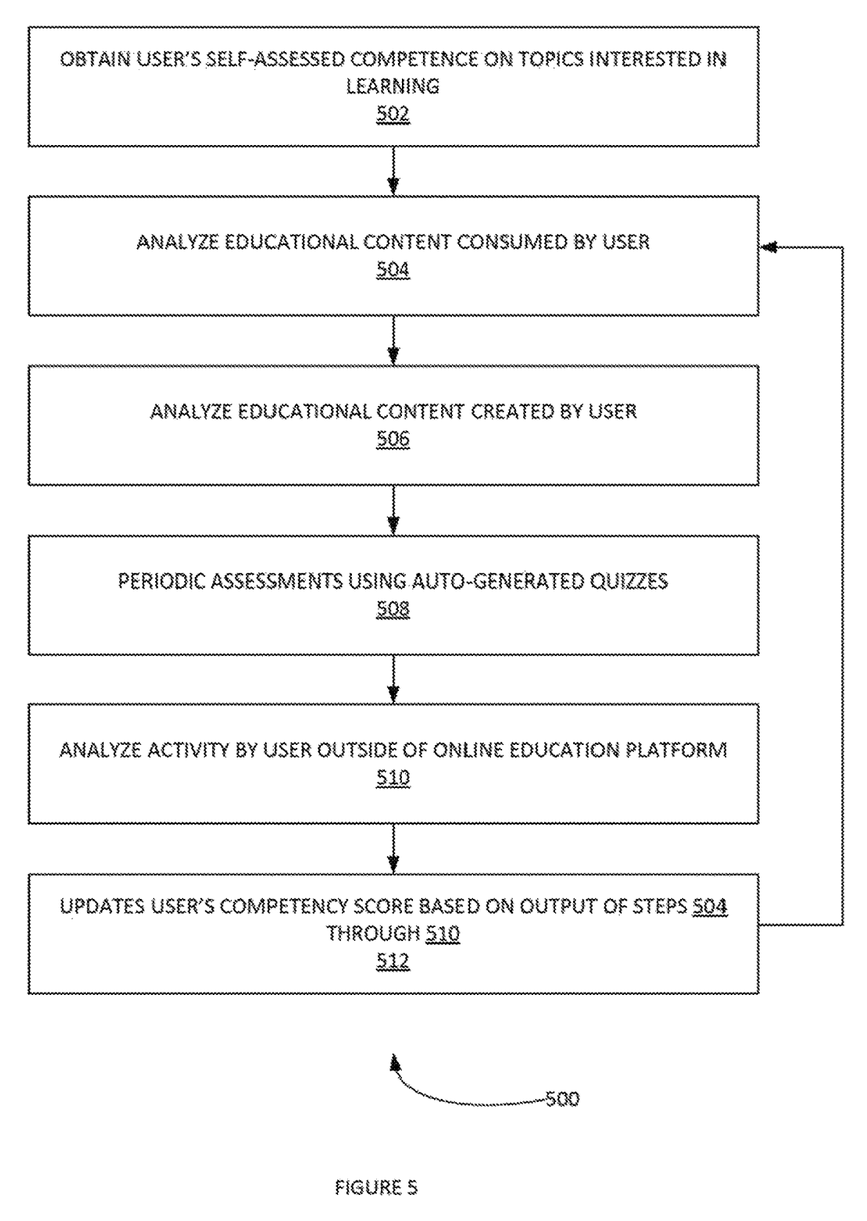
FIG. 5 illustrates an example process for calculating a user's competency score, according to some embodiments.

FIG. 5 illustrates an example process 500 for calculating a user's competency score, according to some embodiments. In step 502, process 500 can obtain user's self-assessed competence on topics interested in learning. For example, users can indicate their self-assessed competence on various topics they are interested in learning when they sign up onto the online educational platform. In one example, this can be done with a continuous scale of one to ten (1 to 10) with ten (10) being the highest level of expertise. Starting from this base assessment, the process 500 can update (e.g. periodically, based on specified event triggers, continuously, etc.) a user's competency score based on the several factors such as those provided in steps 504 through 510.

In step 504, process 500 can analyze educational content consumed by user. For example, process 500 can determine articles read by the user, videos watched by the user, quizzes completed by the user, pathways completed by the user, etc. Each educational content item can add a weighted contribution to the competency score of a user based on difficulty level of the educational content.

In step 506, process 500 can analyze educational content created by user. Process 500 can quantify how the user's contributed educational content was liked by other users. Process 500 can quantify how the amount of educational content created by the user (e.g. videos, articles, quizzes, pathways, comments on content, etc.). Process 500 can quantify how each contribution adds a weighted contribution to the user's competency score based on community feedback. For example, process 500 can quantify how useful the rest of the community found the education content created by the user.

In step 508, process 50 can periodically provide assessments using auto-generated quizzes. The online education platform can provide quizzes (and/or other test formats) for each competency level. The quiz can be a collection of questions automatically generated from information presented in educational content rated at that competency level as the user. This educational content can be educational content that the user has consumed with a specified time period. Users can take these quizzes and receive a score which contributes to a reassessment of the competency score.

In step 510 process 500 can analyze activity by user outside of online education platform. This information can be self-declared and uploaded by the user. Process 500 can include any learning activity outside of the online education platform (e.g. courses completed on external systems, books read, articles read, online videos watched, museum tours taken, lectures attended, foreign language conversations hours with native speakers, time spend programming, internship time, etc.). In step 512, process 500 can update (e.g. periodically, based on specified event triggers, continuously, etc.) user's competency score based on output of steps 504 through 510.

Various methods of matching users with educational content can be utilized. In one example, for each user at a given competency level for a topic, the educational content provided to the user can have the following distribution. Eighty percent (80%) of the educational content can be at the current competency level of the user. For reinforcement purposes, twenty percent (20%) of the educational content can be at a next higher competency level. In this way, the user can be challenged and add to the user's current knowledge base. Assessment quizzes can be provided to the use when the user is near the threshold to graduate to the next competency level. It is noted that these values are provided by way of example and not of limitation. In other examples the distribution of educational content can be varied. Furthermore, various machine learning, optimization and other analysis methodologies can be utilized to optimize the proportions of current competency-level content to higher competency-level content. Additionally, lower competency level content can be provided to users when it is detected that the user is in a temporary learning 'slump'. Educational content can be automatically parsed to create multiple choice questions (e.g. by splitting a sentence and using the different parts of the sentences to create blanks for a user to fill in, etc.).

Figure 6:
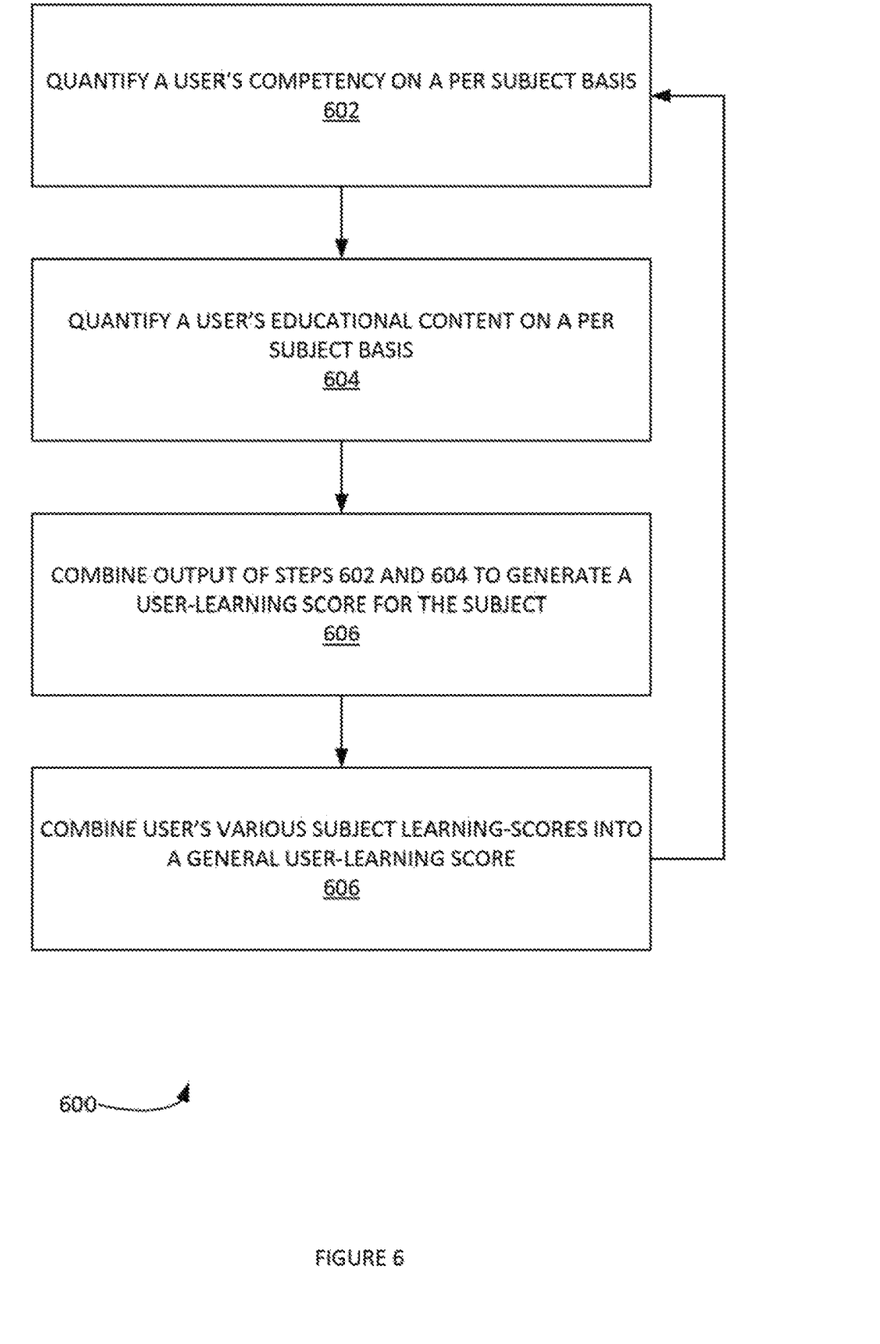
FIG. 6 illustrates an example process of a learning score, according to some embodiments.

FIG. 6 illustrates an example process 600 of a learning score, according to some embodiments. The learning score can be utilized to provide a user with instant (e.g. assuming processing and networking latencies) feedback as to their progress in an online educational platform. The learning score can provide a user a proxy metric relating to the amount of educational content the user is consuming (e.g. how many articles the user is reading, how many videos the user is watching, etc.). The learning score can be standardized such that the user can compare his/her progress with that of other users of the online educational platform. The learning score can also provide the user with a metric for assessing the value of their comments to their peer users. The learning score can provide a single metric of the user's learnings combines with the value of the user's contributed educational content. Accordingly, the learning score can be for both a user and the user's educational content. The learning score can also influence the user's knowledge level/rating in particular skills or areas of competency or topics.

It is noted that, in some embodiments, a learning score can be a standardized score that is applied to a user's current level of expertise in a topic. The learning score can also be a standardized score that is applied to educational content to represent its particular level of difficulty. For example, a user's level of expertise can be based on a range of one to ten (1-10). Likewise, an article's level of difficulty can be based on a range of one to ten (1-10). In this way, users and educational content can be matched based on a common on standard. Users can also be matched with educational content based on other factors such as, inter alia, how much time a user currently has to consume educational content, a rate of improvement selected by the user, random assignment of educational content to a user, etc.

More specifically, in step 602, process 600 can quantify a user competency on a per subject basis. The user-competency portion can indicate the user's progress of learning. The user-competency portion can be on per subject basis. A subject can be, inter alia: a topic (e.g. a tag, keyword, etc.), a learning channel, an individual content, a skill, etc. Process 600 can continually update the user-side score (e.g. upward), or it can be one that is dependent on range of time. For example, a user can be continually updating their user-competency portion and eventually be considered an expert in a particular subject. Alternatively, for topics that are frequently being updated (e.g. laws, politics, etc.), it may not be sufficient to have a continually upward score to be considered as having expertise in an area. Therefore, the user-competency portion may be either reset (e.g. on a periodic basis) and/or be based on a rolling-time period. Over time, as a user stops reading new content in an area, their score may diminish at a specified rate. Alternatively, a mixture of the score may be used. For example, if a user has achieved a specific learning score, the user can be considered at a certain level, and then afterwards, they may achieve extra status based on various factors.

On the educational content side, in step 604, process 600 can quantify a user's educational content on a per subject basis. The user-contribution portion of the learning score can be generated for the educational content provided by the user to the online educational platform. The educational content can be scored based on the content itself, and, accordingly, can have a static portion. For example, the length of an article, the number of words of the article, the topics associated with the article and the difficulty associated with the topics in the article can all be used to quantify the user-contribution portion of the learning score. In some ways the user-contribution portion of the learning score can also have a dynamic element. For example, user-contribution portion of the learning score can be affected by the channels the article is placed in, the number of views, likes, comments, other scoring of that article input by users based on insightfulness, etc. However; the user-contribution portion of the learning score of a contributed-education content may also be adaptive. For example, a Subject Matter Expert (SME) can determine that a contributed content is very insightful (e.g. leading to a higher learning score of the content). In another example, a novice user, not understanding the content because of its difficulty, may determine the contributed content is either not relevant or, even if it is relevant, not useful or insightful. However; this is driven largely by the fact that the user is a novice in the topic area of that educational content. When a novice user gives a negative usefulness rating to a content, the learning score of that educational content may actually increase further in some cases. Additionally, the novice user's knowledge ranking of an area may actually decrease as a result of rating higher-level content as not useful or insightful.

In step 606, process 600 can combine output of steps 602 and 604 to generate a learning score for the subject. In step 608, process 600 can combine user's various subject learning-scores into a general learning score. It is noted that process 600 can continuous repeat at set intervals and/or upon the detection of specified triggers (e.g. new content ratings, new educational content consumption, etc.).

Learning scores can be useful in the determination of usage and what to recommend a user. Learning scores can be useful of a user's knowledge in an area/subject. For example, learning scores may be used to determine what a user is interested in by looking at how frequently the score is updated and how quickly their expertise is increasing. Another use may be to generally evaluate a user's competence in an area and also to use it as a base starting point in another area. For example, a user with a high learning score in medicine may automatically get a higher level rating of knowledge for a related field like basic science.

Methods of a Location-Based Distributed Classroom

Figure 7:
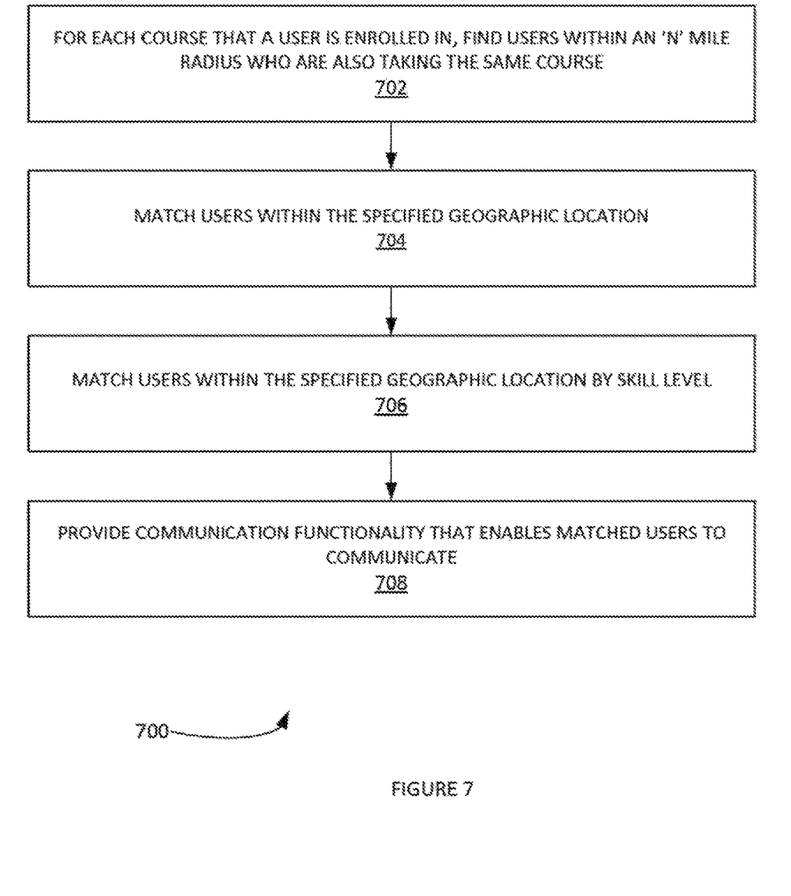
FIG. 7 illustrates an example process for location-based distributed classroom, according to some embodiments.

FIG. 7 illustrates an example process 700 for location-based distributed classroom, according to some embodiments. Process 700 can be utilized to improve the level of interaction between students in online educational courses. For example a single online course can be taken by students in different geographic areas. Process 700 can match students taking the same courses and/or have similar educational interests. Process 700 match students based on their location and/or enrolled courses in order to increase collaboration and interaction between students.

More specifically, in step 702, for each course that a user is enrolled in, process 700 can locate users within an 'N' mile radius who are also enrolled the same course. In step 704, process 700 can match users within the specified geographic location within the 'N' mile radius. In step 706, process 700 can match users within the specified geographic location by skill level as well. For example, skill levels determined in the processes provide supra can be utilized to match users enrolled in the same course and/or related courses. It is noted that a user who previously completed a course can be matched within another user currently enrolled in the course. In step 708, process 700 can provide a communication functionality (e.g. a chat room, contact information (e.g. email addresses, cell phone numbers, etc.), an instant-messaging functionality, etc.) that enables matched users to communicate (e.g. using the online educational platform). Process 700 can allow users to build a relationship and decide to meet up in person. This can enable users to collaborate on course work, as well as, stay motivated.

Method of a Livestream Handoff

Figure 8:
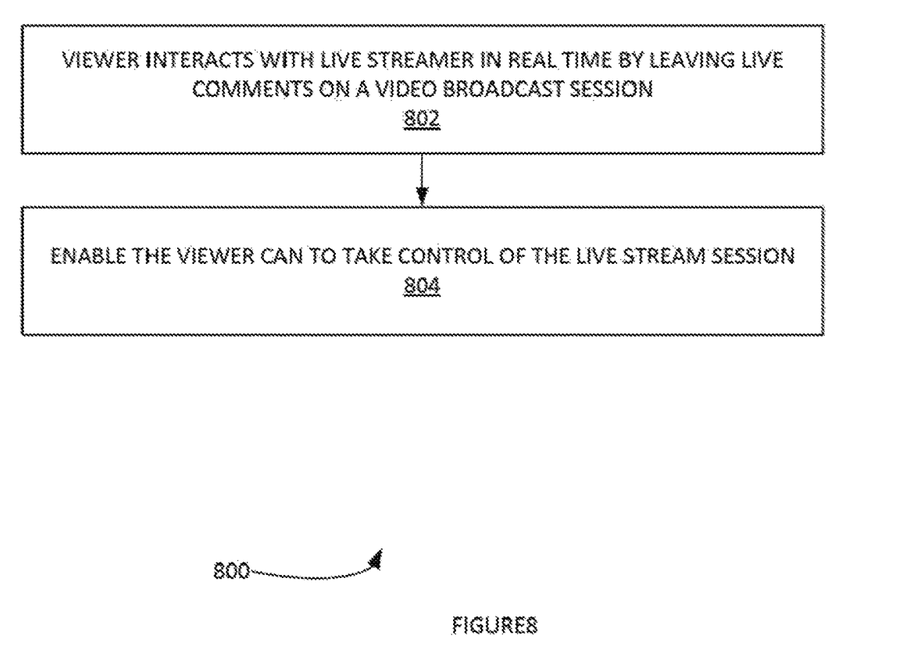
FIG. 8 illustrates an example process of a livestream handoff, according to some embodiments.

FIG. 8 illustrates an example process 800 of a livestream handoff, according to some embodiments. Process 800 can provide viewers of broadcast media to participate and influence the course of the broadcast. Process 800 can provide a handoff wherein viewer of a broadcast media session can participate (e.g. share information with course instructor and/or other viewers of the broadcast media session).

In step 802, process 800 can enable a viewer to interact with live stream session in real time by leaving live comments in the video broadcast. The viewer can also leave live comments and/or other forms of viewer participation. The viewer can then ask questions, etc. that are available to the other participants. In step 804, process 800 can enable the viewer can to take, control of the live stream session (e.g. by invitation of an instructor, etc.). In one example, process 800 can enable any viewer can participate in a many-to-many video feed in order to share (e.g. questions, user-generated content, etc.).

Method of Peer-to-Peer Testing

Figure 9:
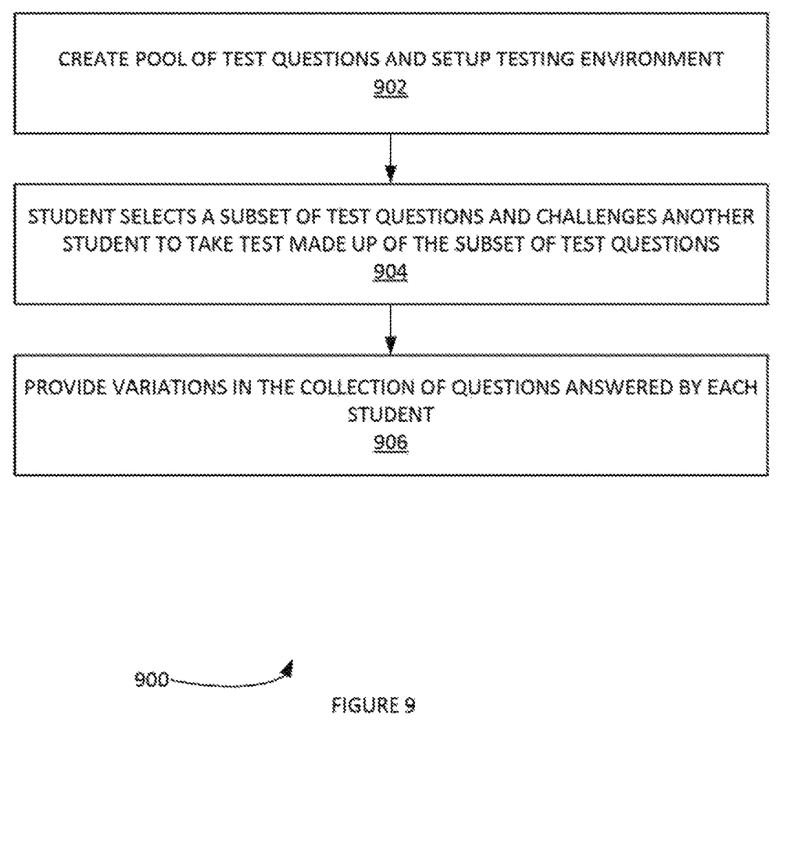
FIG. 9 illustrates an example process for peer-to-peer testing in an online educational platform, according to some embodiments.

FIG. 9 illustrates an example process 900 for peer-to-peer testing in an online educational platform, according to some embodiments. In step 902, process 900 can create tests and setup testing environment. For example, a teacher can create a pool of questions that the students (e.g. a user) can answer. In step 904, process 900 can enable a student can select a subset of the questions and challenge another student to take that, test through the set of questions the student has compiled. In this way, students can be motivated to perform better on the test, as the test is being put forward as a challenge by their peer students rather than by the instructor. In step 906, process 900 can also provide variations ire the collection of questions answered by each student, thus helping them evaluate their learning areas well. The social elements in this type of test taking can also reduce the anxiety and pressure that the students feel during taking a formal test. At the end of the test, students can be graded on how well they compiled the test for the other student and/or how well they performed on the test was given as a challenge to them. These various actions and results can be quantified by process 900 for automatic analysis.

Method of an Adaptive Length of Instruction Video

Figure 10:
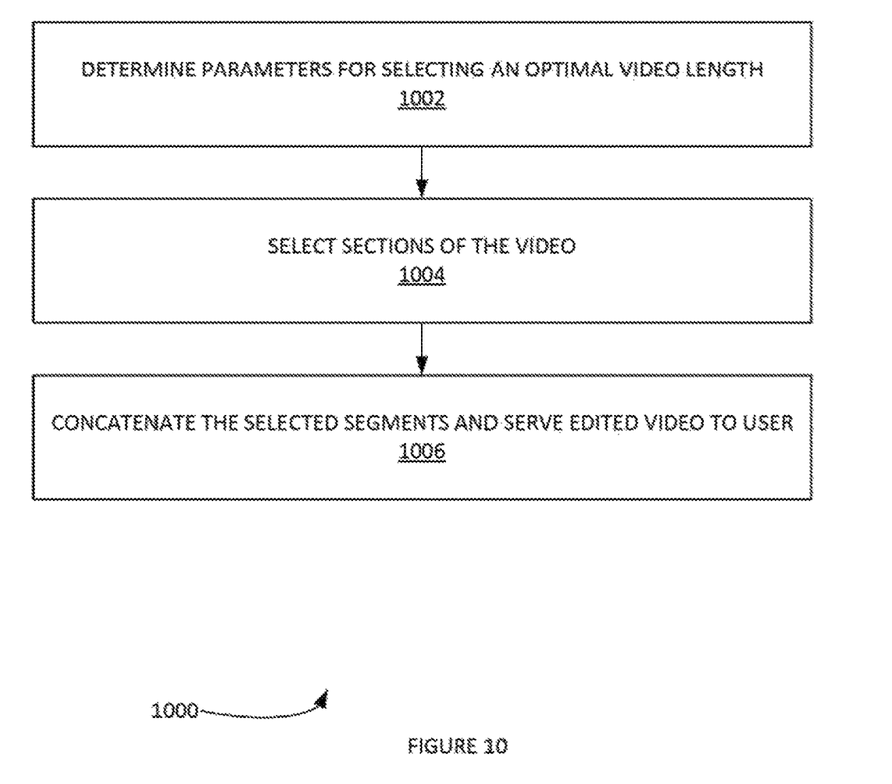
FIG. 10 illustrates an example process for automatically select an optimal video length for a better learning experience by a user, according to some embodiments.

FIG. 10 illustrates an example process 1000 for automatically select an optimal video length for a better learning experience by a user, according to some embodiments. In step 1002, process 1000 can determine parameters for selecting an optimal video length. The following example parameters be used to determine range the length of the video; user age, time of the day, user location, user environment and/or other context, user device type. In step 1004, based on the preferred length and annotated segments, process 1000 can select sections of the video. Then in step 1006, process 1000 can concatenate the selected segments and serve the edited video, to the user, with an option for them to continue. Having annotated segments is important for this. Each segment indicates completeness of a topic on the video. With annotated segments, the system can also give the user options to skip segments and get to content that is more interesting for them.

Various examples of process 1000 are now discussed. In one example, a user can access an online education system application with a smartphone. The application can detect movement through GPS tracking and detects the user is in motion. The application can determine that the user's profile as follows: male, twenty-five (25) years old. Process 1000 can integrate with intelligent-personal assistant services (e.g. Google Now®). Process 1000 can then predict that the user is in the middle of his daily commute and his estimated commute time is fifteen minutes (15 mins). Based on these parameters, process 1000 can decide that the optimal length for the video is seven to ten minutes (e.g. 7 to 10 mins). Since the user is on a mobile device, process 100 can serve one video that has the length in the optimal range and/or can automatically edit (e.g. break up) an eight (8) minute video into two parts and serving it to the user one in a sequential manner. In this way, in the event that the user is interrupted due to distractions, he can resume it from a given part.

In another example, a user can access an online educational platform application on a laptop computer. The application can detect the user's location through a web browser API(s). The application can determine the user's profile: female, 32 years old. By integrating with services like Google Now and the user's calendar, the applications can predict that the user is in her office and has twenty minutes (20 mins) before her next meeting. Based on these parameters, process 1000 can decide that the optimal length for the video is fifteen to seventeen minutes (15-17 mins).

In another example, a user can access an online educational platform application on a laptop computer. The application can detect the user's location through a web browser API(s). The application can determine the user's profile: female, 17 years old. Process 1000 can integrate with intelligent-personal assistant services (e.g. Google Now®. Accordingly, process 1000 can access the user's calendar, and the application can predict that the user is in her school, and she has fifteen minutes (15 mins) to watch an educational video.

In some embodiments, the methods and systems provided herein can be used to assist users in predicting their respective career paths. For example, given current user competency level, future education content that can be provided in the future can be based on, inter alia, skills used by the user in their current job position, manager expectations, skills associated with an aspirational job position, a user's career trajectory, etc. Users can also have accessed to anonymized educational programs of various set of other users. For example, a user may want to become a Python® programmer, the user can access lists of educational content of various other Python® programmers at desired skill levels. In this way, a user can replicate educational content consumption patterns of other successful users. This information can also be used for automatic generation of learning pathways for users. Learning pathways can be personalized to user and personalized to skill. For example, given a user, a set of educational content, a difficulty level(s), a learning pathway can be generated for a user. A learning pathway can be a sequence of education content that a user consumes at a specified rate. An estimated time to complete a pathway can also be assessed. For example, based on a use's competency level a length of time for a user to complete a learning pathway can be determined.

The methods and systems provided herein can also be used to assess a user's engagement with an online educational program. For example, it can assess competency, difficulty of content, rank users by competency, compare progress in course for ranked users, look at daily activity, predict if a user is going to drop out of an educational program, send notices to instructors/users, etc. Group competency scores can also be predicted. For example, once a set of users' competency scores is determined, an aggregated group competency score can be calculated. Recommendations (e.g. recommend learning pathways) can then be provided to the group to improve competency is specified topics.

Conclusion

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A computerized method for collaborative content scoring in an educational platform comprising:
providing an educational content via an online educational platform;
determining, using the online education platform, a genre of the educational content;
setting a base score for the educational content, using the online education platform;
ranking, using the online education platform, users of the online educational platform;
weighing, using the online education platform, a set of implicit actions of higher ranked users when adjusting the base score of the education content based on implicit user actions;
receiving, using the online education platform, an explicit user feedback with respect to the educational content;
receiving, using the online education platform, an implicit user feedback with respect to the educational content;
weighing, using the online education platform, explicit-user feedback greater than the implicit-user feedback when adjusting the base score of the educational content; and
adjusting, using the online education platform, the base score of the educational content to a score based on the explicit user feedback and the implicit user feedback,
wherein the education content comprises an online course content, and
wherein the online course content comprises an online lesson, a video lecture,
an article, an interactive educational game or an audio lecture,
wherein the online course content is delivered via a video file, a text file or an audio file to a user's computing device,
wherein a genre of the educational content, a pedagogical type or a targeted audience,
wherein the score is initially based on a current rating in a relevant genre of the user that posted the education content,
wherein the implicit user feedback is defined by a non-explicit interaction between a set of users and the educational content,
wherein implicit user feedback comprises a length of times a video was watched,
a number of questions asked in a forum, a number of times the educational content was shared by the user, a user's comment length, a user's comment, content, and a number of citations by the user of the educational content in the other content generated by the user.

2. The method of claim 1 further comprising matching the user, using one or more machine learning functionalities, with educational content.

3. The method of claim 1 further comprising automatically selecting, using the online education platform, a video length of the educational content to improve learning experience of the user using one or more parameters of the user.

4. The method of claim 1 further comprising delivering the educational content to a user using an online education system application executing on a smartphone, the online education system application in communication with the online education platform.

* * * * *